3,300,810
EXTRUDER
Robert B. Gregory, Stow, and William S. McCormick, Cuyahoga Falls, Ohio, assignors to NRM Corporation, a corporation of Ohio
Filed Jan. 29, 1964, Ser. No. 341,063
3 Claims. (Cl. 18—12)

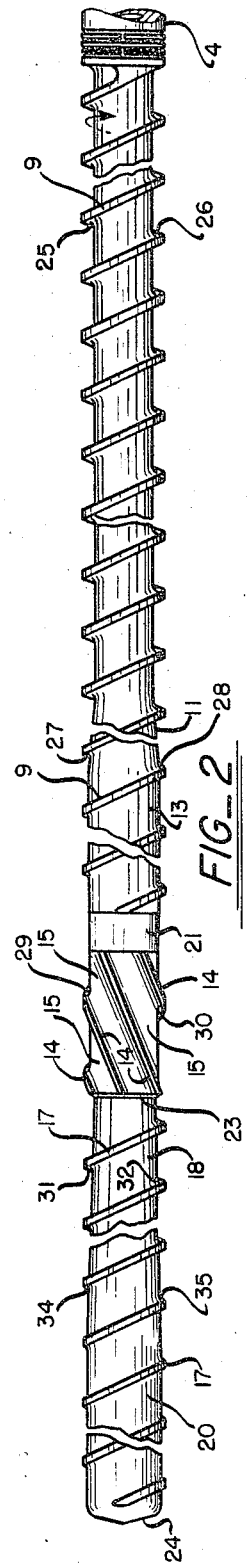
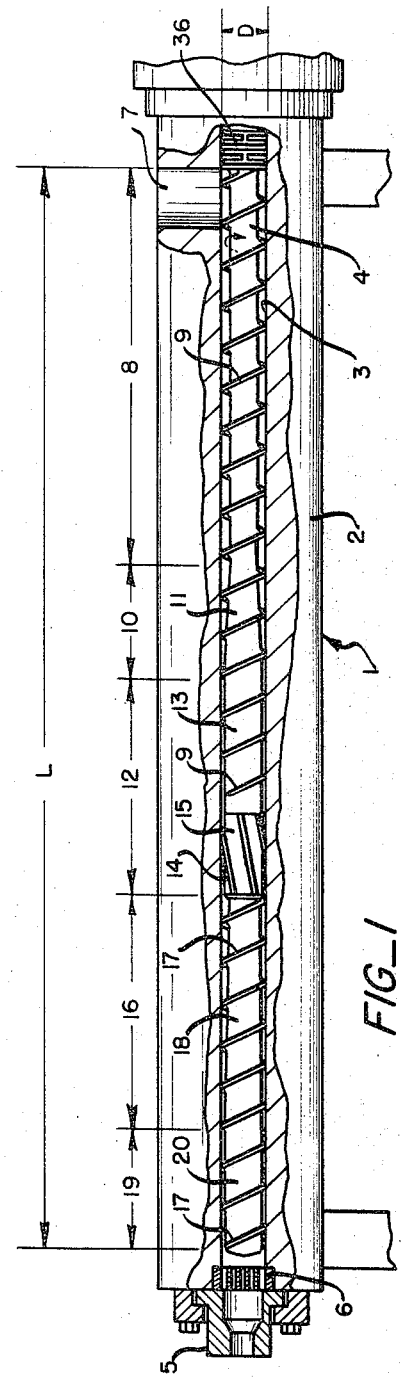

The present invention relates generally, as indicated, to an extruder and more particularly to improvements in the feed screw thereof.

Hitherto in screw type extruders it has been known to provide a longitudinally adjustable feed screw equipped with a frusto-conical surface cooperable with a complementary surface of the cylinder to define an adjustable valve, said valve being readily adjustable to vary the back pressure of the material in the cylinder portion thereahead simply by longitudinally moving the feed screw. For examples of this general type of adjustable valve see the patents to Allen L. Heston, Pat. No. 2,449,652, dated September 21, 1948, and Eugene E. Heston, Reissue No. 23,880, reissued September 28, 1954. It is also known to provide an extruder with an adjustable choke as in Edwin E. Mallory et al. Pat. No. 2,970,341, dated February 7, 1961, in which the feed screw is of uniform diameter and has between its ends a circular rib which cooperates with an enlargement in the cylinder bore to define with the latter an adjustable choke passage upon relative axial adjustment of the cylinder and feed screw.

It is a principal object of this invention to provide an extruder and feed screw therefor by which results superior to those obtained with adjustable choke extruders are achieved by selective treating of the material in the extruder.

It is another object of this invention to provide an extruder and feed screw therefor which produces a homogeneous extrudate of minimum temperature with but slight variation in temperature for better holding of its extruded shape, for reducing the amount of heat which must be removed from the extrudate because of the low enthalpy, and for minimizing the degradation of the material due to high temperature and high shear.

It is another object of this invention to provide an extruder and feed screw therefor in which the latter defines with the cylinder bore a dynamic flow control valve having relatively large flow passages defined between open ended helical ribs of slope opposite to that of the helical feeding ribs of the feed screw.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but one of the various ways in which the principle of the invention may be employed.

In said annexed drawing:

FIG. 1 is a side elevation view of an extruder according to the present invention, said view being partly in cross section to show the entire length of the feed screw; and FIG. 2 is an elevation view of the feed screw on enlarged scale.

Referring now more particularly to the drawing and first to FIG. 1, the extruder 1 comprises a cylinder assembly 2 having a longitudinal bore 3 therethrough of a uniform diameter in which the feed screw 4 is turned by means of a power drive means (not shown) at the right hand end thereof.

Mounted on the discharge end of the cylinder 2 may be the usual extrusion die 5 and breaker plate and screen assembly 6. At the other end of the cylinder 2 is a feed opening 7 for solid plastic material in the form of pellets, granules, chips or the like, said feed opening 7 intersecting the cylinder bore 3.

In essence the feed screw 4 herein shown is divided into five sections, namely (1) A feed section 8 comprising a helical feed flight or rib 9 preferably of constant pitch and constant channel depth;

(2) A first compression section 10 comprising a continuation of flight 9 along the tapered hub 11 of the feed screw;

(3) An intermediate or first metering section 12 comprising a further continuation of flight 9 along hub 13 of uniform diameter, and reverse flights 14 defining open-ended helical channels 15;

(4) A second compression section 16 comprising a flight 17, preferably of the same pitch as flight 9, along tapered hub 18; and (5) A second metering section 19 which comprises a continuation of flight 17 along hub 20 of uniform diameter.

Referring now to FIG. 2, the intermediate or first metering section 12, as aforesaid, comprises, in addition to flight 9 and hub 13, several (herein five in number) equally spaced open ended helical grooves or channels 15 as defined between the left hand helical flights or ribs 14. The channel depth at this section 12 of the feed screw is preferably uniform. It is to be noted that the helical ribs 14 (49°-46' helix angle) have a slope opposite to that of the ribs 9 and 17 (17°-40' helix angle) and thus the rotation of the feed screw 4 in the direction of the arrow in the bore 3 effects a selective treatment of the material in the intermediate or first metering section 12 so that particles of low viscosity move through at a greater velocity than particles of high viscosity. In this way it is believed that the particles of higher viscosity are subjected to heating by conduction from the lower viscosity particles which are moving at a higher velocity and the material is treated with a low energy input resulting in a reduced temperature at discharge. A build-up of some pressure in the material as it is propelled axially by the feeding rib 9 through section 10 is desirable to provide this result and is proportional to the rotational velocity of the screw. This pressure results from the action of the ribs 14 which tend to set up a reverse flow through oppositely sloped channels 15 and the action of ribs 9 and 17 which tend to move the material downstream. Although the pressure automatically varies with the characteristics of the material a balanced design provides for optimum output from the extruder. The hub 21 may be tapered at about 2° between the ends of ribs 9 and 14 so that the channels 15 are slightly deeper than the channel along hub 13.

The section 12 of the feed screw 4 containing the reverse sloped ribs 14 terminates in a chamfer 23 to provide a suddenly increased channel depth which is approximately equal to the channel depth along the feed section 8. The helical rib 17 starts a short distance beyond the chamfer 23 and extends continuously to near the nose 24 of the feed screw 4. The second compression section 16 has a conveying capacity such that positive pressure is obtained at the discharge of the first metering section 12. This is desirable to obtain a uniform discharge from the extruder.

The following results have been achieved with a 3½" water cooled 24:1 $L/D$ extruder with .2 Mi linear polyethylene:

Rate of extrusion _____ lbs./hr__ 300
Discharge pressure _____ p.s.i__ 5015∓3
Extrudate temperature _____° F__ 382∓2

In contrast, with known extruders of that size and using the same material, discharge pressures vary about ∓50 p.s.i. and extrudate temperatures vary about ∓20° F. and have some unmelted particles therein when it is attempted to maintain such low temperatures of the extrudate. Even with extruders having valves or blisters and the same pressure upstream of the valve, temperatures of the extrudate must be in the order of 20° F. higher to obtain the same low temperature variation possible with the extruder of this invention. That uniform distribution or mixing of the material occurs in the present extruder can be demonstrated by dropping a red pellet in the feed opening 7 and noting that the red pigment is visible in the extrudate for about 50 seconds as compared with about 5 seconds in a conventional single stage extruder and about 20 seconds in a conventional two-stage extruder.

Specifically, the above superior low temperature extrusion was obtained in a 3½" extruder in which the length L of the feed screw 4 of 3½" diameter D was about 7', that is, 24:1 L/D ratio. Following is a list of dimensions of said extruder 1:

*Feed section 8*

½" channel depth for about 2½' length with flight 9 of 3½" pitch, 5/16" land width, radius 25 of front side 3/16", and radius 26 of rear side ⅜".

*First compression section 10*

Hub 11 tapers for about 7" length to provide channel depth that decreases from ½" to about 3/16" with flight 9 changing at about middle of hub 11 to radius 27 of front side 1/16" and radius 28 of rear side ⅛" and continuing to hub 13.

*First metering section 12*

3/16" channel depth for about 1' length to hub 13, about 1¾" length of hub 21.

Five equally spaced left hand flights 14 of 13" pitch and 5/16" land width (49°-46' helix angle) for about 6½" length and ¼" constant channel depth.

⅛" front radius 29 and 3/16" rear radius 30.

*Second compression section 16*

30° chamfer 23 to ½" channel depth and hub, flight 17 of 3½" pitch, 5/16" land width, front and rear radii 31 and 32 3/16" and ⅜" respectively for about 1' of the 1½' length of tapered hub 18, and front and rear radii 34 and 35 1/16" and ⅛" respectively for the remaining length of hub 18 and the 10" length of the second metering section 19.

Hub 18 tapers to about 3/16" channel depth.

*Second metering section 19*

Continuation of flight 17 for 10" length with constant 3/16" channel depth.

Another feature of the present invention is that all of the helical ribs 9, 14, and 17 have crests comprising a very hard wear resisting material such as Stellite for about 1/16" depth. Furthermore, the hub of the feed screw 4 and the front and rear faces of said helical flights are chrome plated to reduce to a minimum the coefficient of friction with the plastic material.

As is conventional practice, the outside diameter of the feed screw 4 will be ground to close limits; in this case between 3.500 and 3.499" so as to have the usual close fit in the cylinder bore 3 to preclude flow of material over the crests of the flights 9, 14, and 17.

The grooved section 36 of the feed screw to the right of the feed opening 7 prevents leakage of the plastic material and provides a bearing for the feed screw, said grooved section preferably being flame hardened.

As aforesaid, the feed screw 4 herein shown has a slenderness ratio of 24:1. The first stage volumetric compression ratio and the second stage volumetric compression ratio is 2.41:1.

Other modes of applying the principle of the invention may be employed, change being made as regards the details described, provided the features stated in any of the following claims, or the equivalent of such, be employed.

We therefore particularly point out and distinctly claim as our invention:

1. An apparatus for selectively working material comprising a cylinder having inlet and discharge openings adjacent its ends, and a feed screw rotatable in said cylinder and having first and third sections for advancing material axially through said cylinder from said inlet opening to said discharge opening; said feed screw being characterized in that it has an intermediate section of its length between said first and third sections in which the screw has a plurality of helical rib means of hand opposite to that of said first and third sections and of a substantially greater lead having a helix angle of about 50°, said plurality of helical rib means defining therebetween open-ended helical channels that are effective to differentially impede the advance of particles of material of different viscosities for selective working of material therethrough whereby the particles of low viscosity move through said intermediate section at a greater velocity than the particles of high viscosity and the more viscous slower moving particles are heated by conduction from the less viscous faster moving particles.

2. The extruder of claim 1 wherein the screw in said third section immediately downstream of said intermediate section is of a substantially greater radial depth than said plurality of helical rib means to cause a pressure drop in the material as it leaves said intermediate section.

3. The extruder of claim 2 wherein said feed screw in said first section immediately upstream of said intermediate section is of radial depth no greater than said plurality of helical rib means.

References Cited by the Examiner

UNITED STATES PATENTS

| | | | |
|---|---|---|---|
| Re. 23,880 | 9/1954 | Heston | 18—12 |
| 2,519,014 | 8/1950 | Bankey | 18—12 X |
| 2,615,199 | 10/1952 | Fuller | 18—2 X |
| 2,730,759 | 1/1956 | Glass et al. | 18—12 |
| 2,733,051 | 1/1956 | Street. | |
| 2,753,595 | 7/1956 | Dulmage | 18—12 |
| 3,035,306 | 5/1962 | Rossiter | 18—2 X |
| 3,070,836 | 1/1963 | DeHaven et al. | 18—12 X |
| 3,115,675 | 12/1963 | Tedder | 18—12 |

FOREIGN PATENTS

| | | |
|---|---|---|
| 1,251,409 | 12/1960 | France. |
| 1,315,518 | 12/1962 | France. |
| 882,517 | 11/1961 | Great Britain. |
| 526,322 | 5/1955 | Italy. |

WILLIAM J. STEPHENSON, *Primary Examiner.*

J. SPENCER OVERHOLSER, *Examiner.*

L. S. SQUIRES, *Assistant Examiner.*